United States Patent Office 2,974,424
Patented Mar. 14, 1961

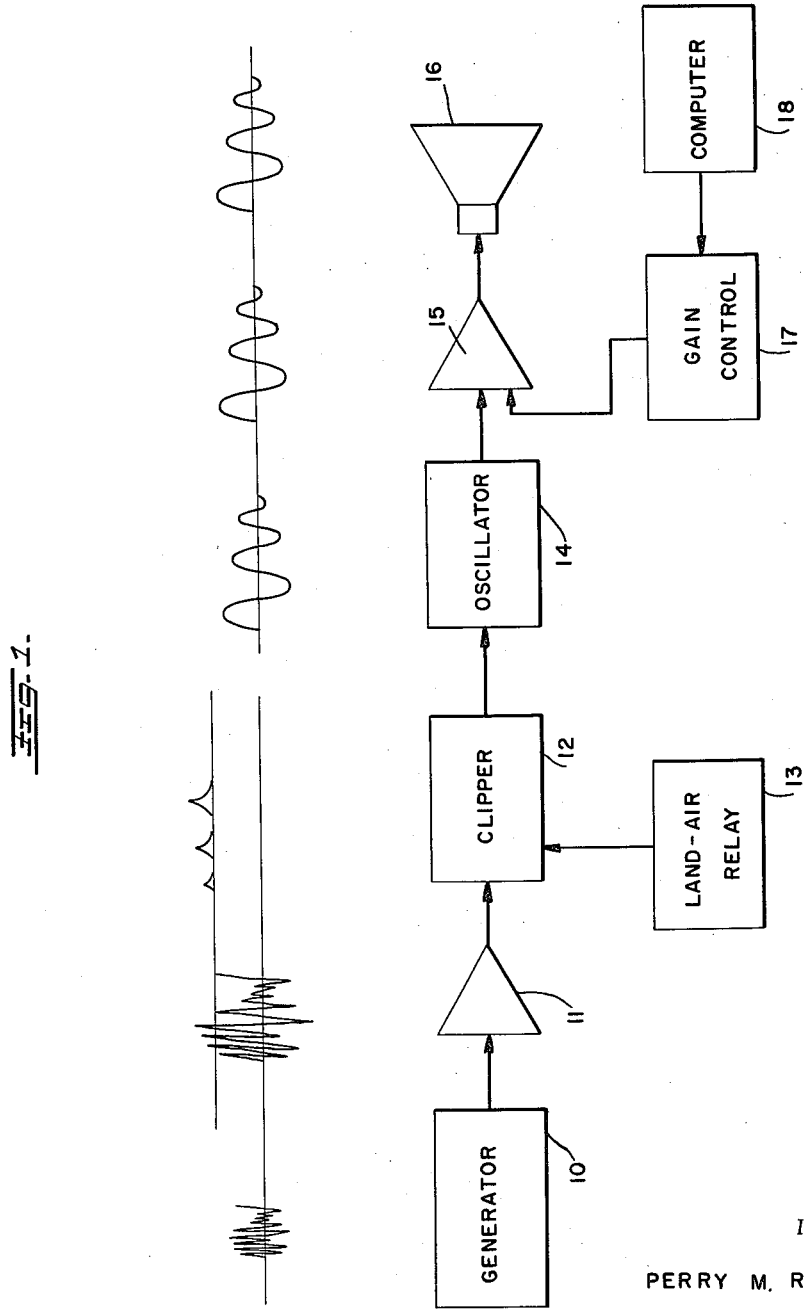

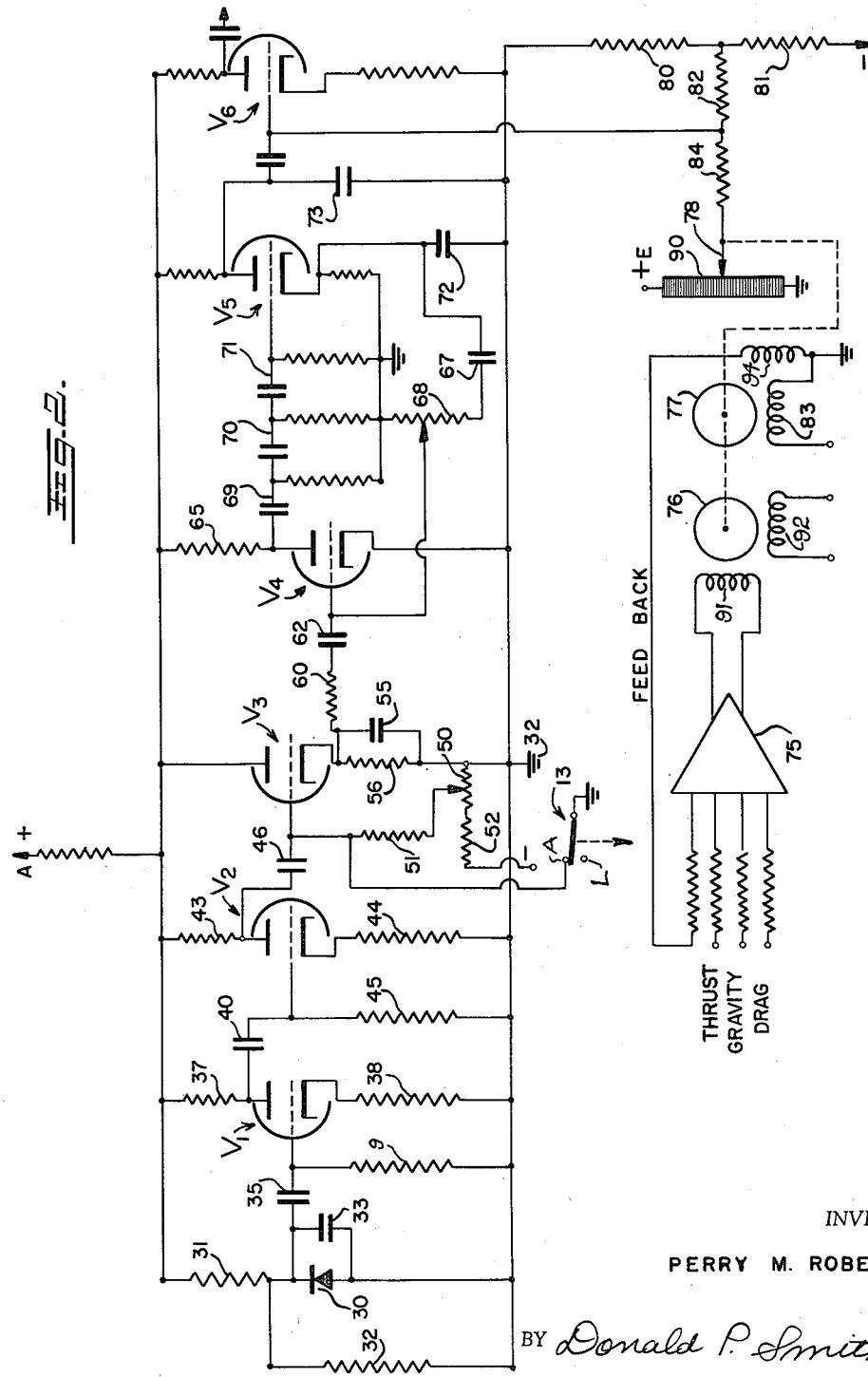

2,974,424
SOUND SIMULATOR CIRCUIT

Perry M. Roberts, West Hyattsville, Md., assignor to ACF Industries, Incorporated, New York, N.Y., a corporation of New Jersey Filed Jan. 10, 1958, Ser. No. 708,231

8 Claims. (Cl. 35—12)

This invention relates, in general, to flight simulating apparatus and more particularly to apparatus useful in training students for the operation of aircraft. Still more particularly the invention relates to a sound simulating circuit which reproduces the sound characteristics of large tanker type aircraft when landing or leaving the ground with empty tanks.

In the operation of aircraft a variety of noises are heard by the crew, such noise simulations being known in prior art circuitry such as engine noise, atmospheric noise, and the like. It is usually sufficient for flight simulators of conventional type aircraft to reproduce these sound types to give a realistic effect to the simulated flight. Recently, however, the development of the large air refueling type aircraft which carries large quantities of liquid gave rise to a need for a sound simulation to reproduce the noise made by such a plane when landing or leaving the ground with most of its liquid cargo expended. The sound is similar to a series of small hammers intermittently striking a large empty metallic tank, and in the actual craft is a function of air speed, being loudest when the aircraft initially engages the ground upon landing and fading as the speed drops to standstill and conversely increasing in volume as the aircraft takes off, with empty tanks, to a maximum value upon leaving the ground after which the sound ceases. It is within the purview of this invention to provide a circuit that will realistically produce these sound effects to a student being trained in the operation of a tanker type plane.

A principal object therefore of this invention is to provide improved flight simulating apparatus for the ground training of personnel and to represent a flight condition that is efficient and realistic.

A further object of this invention is to provide an improved flight simulating system including a circuit to reproduce the sound made by a tanker plane upon landing or leaving the ground with empty tanks.

A still further object of this invention is to provide an electronic circuit having a damped random sine wave output which varies in amplitude as a function of another variable.

The invention will be more fully set forth in the following description and the accompanying drawings, and the novelty will be pointed out with particularity in the claims annexed to and forming a part of the specification.

Referring now to the drawings:

Figure 1 is a block diagram illustrating certain components of an electronic flight system.

Fig. 2 is a schematic illustration of the circuit of Fig. 1 showing the components thereof in more detail.

Summarily stated, the invention provides in an aircraft trainer for simulating to a student the sound made by a tanker plane when leaving the ground or landing with empty tanks a circuit consisting of a phase shift oscillator to generate a damped audio frequency wave, and a random noise generator connected to the oscillator to trigger the same. A clipper is provided to remove most of the random noise generator output leaving only pulses of predetermined clipping level which control the frequency of occurrence of the noise of the oscillation from the phase shift oscillator. The energy from the oscillator is amplified and fed to a speaker located in the vicinity of the student, and a gain control circuit is provided responsive to the magnitude of simulated flight to vary the amplitude of the oscillation in accordance with flight condition.

Referring now to Fig. 1, reference character 10 designates a noise generator which, as will be later more particularly pointed out, consists of a diode having a random noise output substantially as there shown. The output of generator 10 is fed to an amplifier 11 where the magnitude of the energy is increased substantially. The output of amplifier 11 is connected into a clipper circuit 12 where the clipping level provides that only pulses of a predetermined level will appear in the output and a pulse stretching circuit increases the pulse time duration. A relay designated as reference character 13 is connected into the clipper circuit, such relay being responsive to the condition of simulated flight to cause the clipper to be inoperative when the aircraft is in the air. The output of clipper 12 is fed to phase shift oscillator 14 where it triggers a damped audio wave. The frequency of the occurrence of the audio waves is a function of the frequency of arrival of pulses from clipper 12 into the input of the oscillator. The oscillator output is connected to amplifier 15 which drives speaker 16 disposed in the cockpit where the student is being trained. The amplitude of the output of amplifier 15 is a function of simulated flight velocity and a gain control circuit 17 receives a signal from the flight computer 18 to thereby change output to the speaker as will later be more fully pointed out so that upon landing the plane at a high velocity the amplitude of the waves connected to speaker 16 will be large. Conversely, upon leaving the ground the wave terminates in accordance with actuation of relay 13.

Referring now to Fig. 2 where the details of the block diagram of Fig. 1 are revealed and starting at the left hand side a diode reference character 30 is used as the noise source. It is known that a rectifier will produce random noise when a D.C. voltage is impressed upon it in a backward sense. A network comprising resistors 31 and 32 connect the rectifier 30 between source of positive direct current voltage as at A and ground at 32 to produce the required voltage division. Condenser 33 is connected across the rectifier 30 to shunt some of the undesired higher noise frequencies. The noise output of rectifier 30 is passed through coupling condenser 35 to the grid of multi-electrode tube V1 which has the usual plate and cathode connections through resistors 37 and 38 respectively, and a grid leak 9. Coupling condenser 40 connects the amplified output of tube V1 to the grid of tube V2 for further amplification. Here resistors 43 and 44 interconnect the elements of the tube into the circuit, and conventional grid leak resistor 45 is also provided for normal tube operation. Coupling condenser 46 passes the output of tube V2 to the grid input of tube V3. It will here be seen that relay 13 grounds the output of tube V2 when the plane is in flight thereby effectively preventing any noise while the plane is in flight. Relay 13 is in the conventional land-air computer which is known in the art and is energized when the plane is on the ground. Such a relay is shown in U.S. Patent 2,731,737 to R. G. Stern for Aircraft Training Apparatus for Simulating Landing and related maneuvers. Relay N8 of Fig. 9 of that patent is indicated as the main land-air relay. As computed, the coil of relay 13 remains energized until the plane is about 50 feet in the air whereupon it is deenergized and the armature applies ground to the grid of V3 thereby disabling the circuit.

A cathode clipper circuit receives the output of tube V2 and an adjustable biasing rheostat 50 is provided to adjust the bias of V3 to set the degree of clipping to a predetermined value. Noise signals coming from the plate of V2 are impressed through coupling condenser 46 to the grid of tube V3. Resistor network 50, 51 and 52 provide the bias for the grid of tube V3 and is adjustable by rheostat 50 so that a pulse of predetermined level is required to overcome the bias so that tube V3 will conduct. Upon conduction of tube V3, in response to the arrival of a pulse of required magnitude condenser 55 charges at a high rate. When the tube cuts off at the termination of the pulse, condenser 55 then discharges through resistor 56 so that the discharged time of condenser 55 is longer than the charge time. This has the effect of keeping the cathode of tube V3 in a condition of positive bias and lengthens the pulse time or changes the rate of decay because the tube remains cut off and the only path of discharge for condenser 55 is through resistor 56. Since condenser 55 was fully charged when tube V3 conducted the discharge cycle thus has the desired effect of stretching or lengthening the time duration of the pulses.

A feedback type phase shift oscillator receives the output of the clipper through resistor 60 and coupling condenser 62. The energy through condenser 62 is fed to the grid of tube V4 which has the usual plate resistor 65, and a feedback loop from the cathode of tube V5 conducts energy through condenser 67 and variable resistor 68 for reamplification. Three phase shift L-sections consisting respectively of a condenser and a resistor 69, 70 and 71 shift the phase of the output from the plate of tube V4 a total of 180° and the feedback connection feeds this energy back to the grid of tube V4. Condenser 72 connects the cathode of tube V5 to ground to eliminate transient peaks. In the instant application the feedback is adjusted to obtain a damped audio oscillation of about 90 cycles per second. In the usual phase shift oscillator, oscillations are started by any circuit change such as a plate supply ripple or tube noise. When a disturbance occurs the slight change is amplified, inverted 180° at the plate and inverted another 180° by the R–C network to be returned in phase to the grid of the tube for reamplification. This cumulative build-up is repeated until the tube cannot amplify further because of plate current saturation. In the instant circuit the feedback potentiometer 68 acts to damp out the oscillations and accordingly an external noise source is required to positively start the oscillations. This is the function of the random noise circuitry.

The output circuit will be discussed in connection with a portion of the flight simulator computer since this is depended upon to control the output volume to the student. According to well-understood principles of aerodynamics, air speed is a function of engine thrust, gravity effect which may be either positive or negative depending on whether the plane is climbing or diving, and drag which is considered to be always negative. A series of voltages representing various values of thrust, gravity and drag according to their polarity and magnitude are fed separately into an amplifier reference character 75 the output of which is used to control a servo system including a motor 76 and a generator 77 mechanically coupled together as shown and to the wiper arm 78 of a potentiometer. The motor 76 is of the two phase type having a control phase 91 energized by the amplifier output and the other phase 92 energized from a constant source of alternating current dephased 90° from the amplifier output. The rotation, then, of motor 76 will be a function of the control voltages in the respective motor phases and when the polarity of the control voltage is reversed the direction will change. In any case, the rate of rotation depends on the magnitude of the control voltage. Generator 77 is a two phase feedback generator having one phase winding 83 energized by a 90° dephased reference voltage and the other phase 94 generating in accordance with the speed of motor 76 a feedback voltage which is returned to amplifier 75 for the purposes of straight line response as is well understood.

Operation of motor 76 in response to voltage input signals from the thrust, gravity and drag computers will cause wiper 78 to move up and down on winding 90 which is energized, as shown, from a source of voltage thereby picking off intsantaneous voltages in accordance with the resultant airspeed. This voltage is applied to the bias network of the output amplifier V6. A fixed bias in the order of —8 volts D.C. is maintained at the junction of resistors 80, 81, and 82 and the voltage applied to resistor 84 from wiper arm 78 varies from 7 volts when the plane is moving at a velocity of 50 miles per hour on takeoff to about 50 volts when the plane is moving at a velocity of about 700 miles per hour. It will accordingly be seen that the voltage applied to the grid of tube V6 is a function of the simulated flight airspeed and when the aircraft in simulated flight touches down at its landing velocity relay 13 is in the land (L) position and the gain of the output tube V6 is a maximum; as the aircraft slows down the positive voltage applied to resistor 84 decreases and the output becomes smaller thereby simulating the reduction in noise level as plane slows.

The operation of the before-described system is as follows: Noise from the biased diode is amplified by V1 and V2 to a predetermined value (about 2 volts) and is clipped, and the pulses are stretched so that the pulses are fed to trigger the damped wave oscillator 14. Relay 13 disables the clipping circuit when the plane is airborne (A) whereby no output of the circuit is possible. The phase shift oscillator generates a damped audio frequency when a pulse is received which is fed to the output circuit. Depending on the airspeed the amplitude of the output is made responsive to condition of flight. When the plane is to take off the land-air relay is energized and the armature is in the down (L) position. Pulses, then, trigger the oscillator and the energy is applied to the output circuit, but the gain control circuit keeps V6 biased off until sufficient ground speed is attained (about 50 m.p.h.). As the takeoff speed increases the volume increases until the craft is airborne whereupon the land air relay is deenergized and moves to the A position and the grid of clipper tube V3 is grounded. No tank noise therefore is heard by the student during flight. Upon initial landing the bias on V6 is at a maximum and the sound output is also a maximum. As the plane rolls toward a simulated stop the bias decreases together with the volume output.

As a matter of circuit construction tubes V1 and V2 are each one half of a type 12AX7, and rectifier 30 is a 1N34. Tubes V4 and V5 are each one half of a type 12AT7 and tubes V3 and V6 are each one half of a 12AX7.

It will be seen from the above that a novel system to simulate sounds made by a tanker type plane when landing or leaving the ground has been provided. Since the output is fed to a speaker in the vicinity of the student's seat in the cockpit, the effect is very realistic and adds greatly to the value of the training flight. It should be understood that this invention is not limited to the specific details of construction and arrangement herein illustrated but that changes in modifications may occur to those skilled in the art without departing from the spirit of the invention.

I claim:

1. In an aircraft trainer a system for simulating to a student the sound made by an empty tanker plane when leaving the ground or landing comprising an oscillator circuit to generate a damped wave frequency in the low audio range, a noise generator connected to said oscillator to trigger the same, means to vary the frequency of occurrence of pulses from said generator to the oscillator, said last recited means including circuit interrupter means responsive to the status of the simulated flight to disable the same when the plane is airborne, and an output circuit connected to said oscillator and having means to control the amplitude of the output volume as a function of simulated flight velocity.

2. In an aircraft trainer a system for simulating to a student the sound made by an empty tanker plane when landing or leaving the ground comprising a phase shift oscillator circuit to generate an audio frequency in the low audio range, a noise generator to trigger said oscillator, means to vary the frequency of occurrence of pulses from the generator, an output circuit connected to said oscillator, and a gain control circuit connected to said output circuit to control the amplitude of the audio frequency output of the oscillator as a function of simulated flight velocity.

3. In an aircraft trainer a system for simulating to a student the sound made by an empty tanker plane when landing or leaving the ground comprising a phase shift oscillator circuit to generate an audio frequency in the low audio range, a generator to trigger the oscillations at random intervals, means to adjust the triggering intervals, means responsive to the status of the simulated flight to disable the generator means when the plane is airborne, an output circuit to increase the energy of the oscillations and having means responsive to simulated flight velocity to control the amplitude of the output energy.

4. In an aircraft trainer a system for simulating to a trainee the sound made by an empty tanker plane when landing or leaving the ground comprising a phase shift oscillator circuit to generate relatively low audio frequency energy, a noise generator circuit connected to trigger said oscillator, said noise generator circuit including a relay responsive to the status of the simulated flight to open the connection to the oscillator when the plane is airborne, and an output circuit connected to said oscillator to drive a speaker in the vicinity of the trainee and including a control circuit to vary the loudness of the sound as a function of simulated flight velocity.

5. In an aircraft trainer having a cockpit to house a trainee during a simulated flight a system for reproducing the sounds made by an empty tanker plane when landing or leaving the ground comprising in combination a phase shift oscillator to generate a damped wave frequency in the low audio range, an output circuit to drive a speaker fixed in the vicinity of the trainee, an electrical circuit connected between a trainer flight computer and the said output circuit to vary the output volume of the speaker as a function of a simulated flight variable, and a noise generator connected to the said oscillator to trigger the same.

6. The invention as set forth in claim 5 including a clipper circuit connected between the said noise generator and oscillator to adjust the level of the energy input to the oscillator.

7. The invention as set forth in claim 6 including a relay in the said clipper circuit to disable the same when the plane is airborne.

8. In an aircraft trainer a system for simulating sound comprising in combination an oscillator of the phase shift type to generate a frequency in the low audio range and having a feedback loop to vary the rate of decay of the audio frequency, a diode noise generator connected to said oscillator to trigger the same, means to control the frequency of occurrence of the noise output of said generator, an output circuit connected to said oscillator, and an output control circuit to vary the amplitude of the audio frequency of the oscillator as a function of simulated flight velocity.

References Cited in the file of this patent

UNITED STATES PATENTS

| | | |
|---|---|---|
| 2,445,712 | Forbes | July 20, 1948 |
| 2,494,594 | Swank | Jan. 17, 1950 |
| 2,731,737 | Stern | Jan. 24, 1956 |
| 2,749,441 | Kelly | June 5, 1956 |
| 2,768,371 | Konrad | Oct. 23, 1956 |
| 2,819,460 | Jacobs | Jan. 7, 1958 |
| 2,826,691 | Elliott | Mar. 11, 1958 |
| 2,898,587 | Nye | Aug. 4, 1959 |

FOREIGN PATENTS

| | | |
|---|---|---|
| 726,878 | Great Britain | Mar. 23, 1955 |